US006444184B1

(12) United States Patent
Goss

(10) Patent No.: US 6,444,184 B1
(45) Date of Patent: Sep. 3, 2002

(54) SEMIDRY REMOVAL OF $SO_2$ IN CIRCULATING REACTOR

(76) Inventor: Willard L. Goss, 108 Lintel Dr., McMurray, PA (US) 15317

( * ) Notice: Subject to any disclaimer, the term of this patent is extended or adjusted under 35 U.S.C. 154(b) by 0 days.

(21) Appl. No.: 09/588,567

(22) Filed: Jun. 7, 2000

(51) Int. Cl.[7] ............................................... B01D 53/50
(52) U.S. Cl. .............. 423/210; 423/244.01; 423/244.07
(58) Field of Search ....................... 423/244.01, 244.07, 423/210

(56) References Cited

U.S. PATENT DOCUMENTS

| 4,122,150 A | * | 10/1978 | Hori et al. ................... 423/242 |
| 4,581,210 A | * | 4/1986 | Teller ......................... 423/242 |
| 5,173,279 A | * | 12/1992 | Dumont et al. ........... 423/240 S |
| 5,230,871 A | * | 7/1993 | Martin et al. ........... 423/244.07 |
| 5,814,288 A | * | 9/1998 | Madden et al. ......... 423/244.01 |

FOREIGN PATENT DOCUMENTS

| EP | 0 196 481 A1 | * | 10/1986 | ............. 423/244.07 |
| WO | WO 89/07974 | * | 9/1989 | ............. 423/244.01 |

* cited by examiner

Primary Examiner—Steven P. Griffin
Assistant Examiner—Timothy C Vanoy
(74) Attorney, Agent, or Firm—Lorusso & Loud

(57) ABSTRACT

A semi-dry process for removing $SO_2$, from a waste gas involves the introduction of a water-bearing particulate solid alkaline absorbent, as a free-flowing powder, into an absorption zone. The waste gas is passed through the absorption zone to entrain the powder, forming a moving bed, while the $SO_2$ is first dissolved in the aqueous phase to form an acid and the acid then reacts with the alkaline absorbent. The moving bed is continuously transported toward a gas/solids separator wherein solids, including a water-insoluble reaction product of the $SO_2$, are removed from the gas stream and recovered. The recovered particulate solids are reconditioned for return to the absorption zone by admixing with a particulate alkaline material, e.g., $Ca(OH)_2$, and water to form a coating of an aqueous slurry of the alkaline material on the recycled solids as the water-bearing particulate solid alkaline absorbent. The reconditioned, recycled solids are returned to the absorption zone containing 5–40 wt. % water. By eliminating the slurry spray of the prior art from the absorption zone and providing a large surface area for drying and absorption, the drying and reaction times are reduced to less than 5 seconds, and nozzle plugging, nozzle abrasive wear and external deposits on the nozzle are eliminated. The large surface area and short drying time also help to avoid agglomeration of solids within the absorption zone.

11 Claims, 3 Drawing Sheets

SEMIDRY REMOVAL OF $SO_2$ IN CIRCULATING REACTOR

FIELD OF THE INVENTION

The present invention relates to scrubbing of $SO_2$ and other acid gases from the combustion products emitted by boilers and other industrial processes. The invention relates to the use of a circulating reactor in conjunction with dry particulate collection.

THE PRIOR ART

In prior art methods, used for cleaning of flue gases from boilers, incinerators and other combustors, the flue gases are contacted with a slurry of alkaline reagent in a reactor vessel, commonly known as a spray dryer, in which the slurry is dried, and acid gases react with the alkaline reagent to form solid particulate. In other prior-art methods, the flue gases are contacted with a dry alkaline reagent injected as a powder into a reactor vessel in which a separate cooling water stream is injected. In both prior art methods, the flue gas is humidified and cooled in the reactor, and the particulate reaction products are collected in a fabric filter or electrostatic precipitator. In both prior art methods, the alkaline reagent may consist of a portion of the collected particulate reaction products and an amount of fresh alkaline material, in most cases $Ca(OH)_2$. In these prior art methods, the reactors were subject to internal deposition of alkaline material, and nozzles were subject to plugging, abrasive wear, and external deposits, all of which reduce the reliability of the prior art methods.

SUMMARY OF THE INVENTION

Accordingly, one object of the present invention is to overcome the problems in the prior art as noted above. Other objects of the present invention include increased efficiency of utilization of the alkaline reagent, shortened drying time, lower pressure drop across the system, higher reliability, improved turndown capability, and the ability to dispose of liquid waste steams containing dissolved alkali salts.

The present invention achieves the foregoing objectives by providing a process for removing acid gases, including $SO_2$, from waste gases, wherein a free-flowing, moisture-containing particulate alkaline absorbent is introduced into an absorption zone through which the waste gas is passed and absorbent is entrained in the waste gas and transported to a gas/solids separator. Within the absorption zone, $SO_2$ and other acid gases react with the particulate alkaline absorbent to form the acid salts (reaction products) of the alkaline absorbent. The waste gases and particulate solids, including reaction products flow to the gas/solids separator, wherein the particulate is separated from the gases and is recovered in the hoppers of the separator. A major portion of the recovered particulate is returned to a mixer wherein the particulate is admixed with a water suspension of calcium hydroxide or other alkaline reagent to form the free-flowing particulate alkaline absorbent, which is reintroduced in the absorption zone to remove acid gases.

For the purpose of promoting the reactions by which the acid gases are absorbed, and to avoid agglomeration of solids in the absorption zone, the moisture content of the particulate alkaline absorbent is controlled to be within 5–40 weight % based on the total weight of the absorbent feed to the absorption zone. More preferably, the moisture content of the absorbent is controlled to be within 5–20 weight %. Within the mixer, the recovered particulate is coated with a water suspension of alkaline reagent. The water suspension of the alkaline reagent is prepared externally to the mixer. The alkaline reagent is preferably calcium hydroxide produced by the reaction of water with calcium oxide.

The presence of small amounts of chloride in the particulate alkaline absorbent will improve the absorption of $SO_2$ and reduce consumption of calcium hydroxide. The chloride may originate in the waste gases entering the absorption zone, or in one preferred embodiment of the invention, may be added to the particulate alkaline absorbent in the mixer. In this case, an aqueous solution of calcium chloride is introduced in conjunction with the calcium hydroxide suspension.

In the preferred embodiments, the process of the present invention uses flash drying.

One major advantage Of the present invention is the ability to treat aqueous waste streams originating outside the process, converting the dissolved metal alkaline salts contained therein to a dry particulate solid that is collected in the gas/solids separator. In such cases, the waste stream is introduced in the mixer in conjunction with the calcium hydroxide suspension.

Another important advantage of the present invention is the avoidance of spray nozzle plugging and abrasion associated with prior art processes wherein slurry of calcium hydroxide is contacted with the waste gas stream. By eliminating the slurry spray from the absorption zone and providing a large surface area for drying and absorption, the drying and reaction times are reduced to less than 5 seconds, and nozzle plugging and abrasive wear are eliminated. The large surface area and short drying time also help to avoid agglomeration of solids within the absorption zone.

In a preferred arrangement of the process, a supplemental water injection point is provided in the inlet to the absorption zone. This supplemental water is independent of the particulate alkaline absorbent feed. By separating a portion of the cooling water from the particulate alkaline absorbent, this preferred embodiment offers the following advantages:

1. The waste gases can be cooled during startup and during transfer of operation between plural reactors. The waste gases may be cooled when acid gas scrubbing is not required, in order to protect the gas/solids separator from excessive temperatures. The separate water injection facilitates system operation and allows for operation without add gas scrubbing.

2. By introducing a portion of the required cooling water at the absorption zone, prior to introduction of the absorbent, the amount of recycled particulate material is reduced. The use of the independent water injection may reduce the recycle material amount by up to 50%.

3. The separate water injection may also serve as a location for introducing other materials that will enhance the acid gas absorption.

The recycle silo is provided with a metering device (commonly known as a feeder) in the silo hopper, to control the flow of recycle particulate to the mixer. Excess particulate is separately discharged to a disposal system.

DESCRIPTION OF THE PREFERRED EMBODIMENTS

Figure 1:
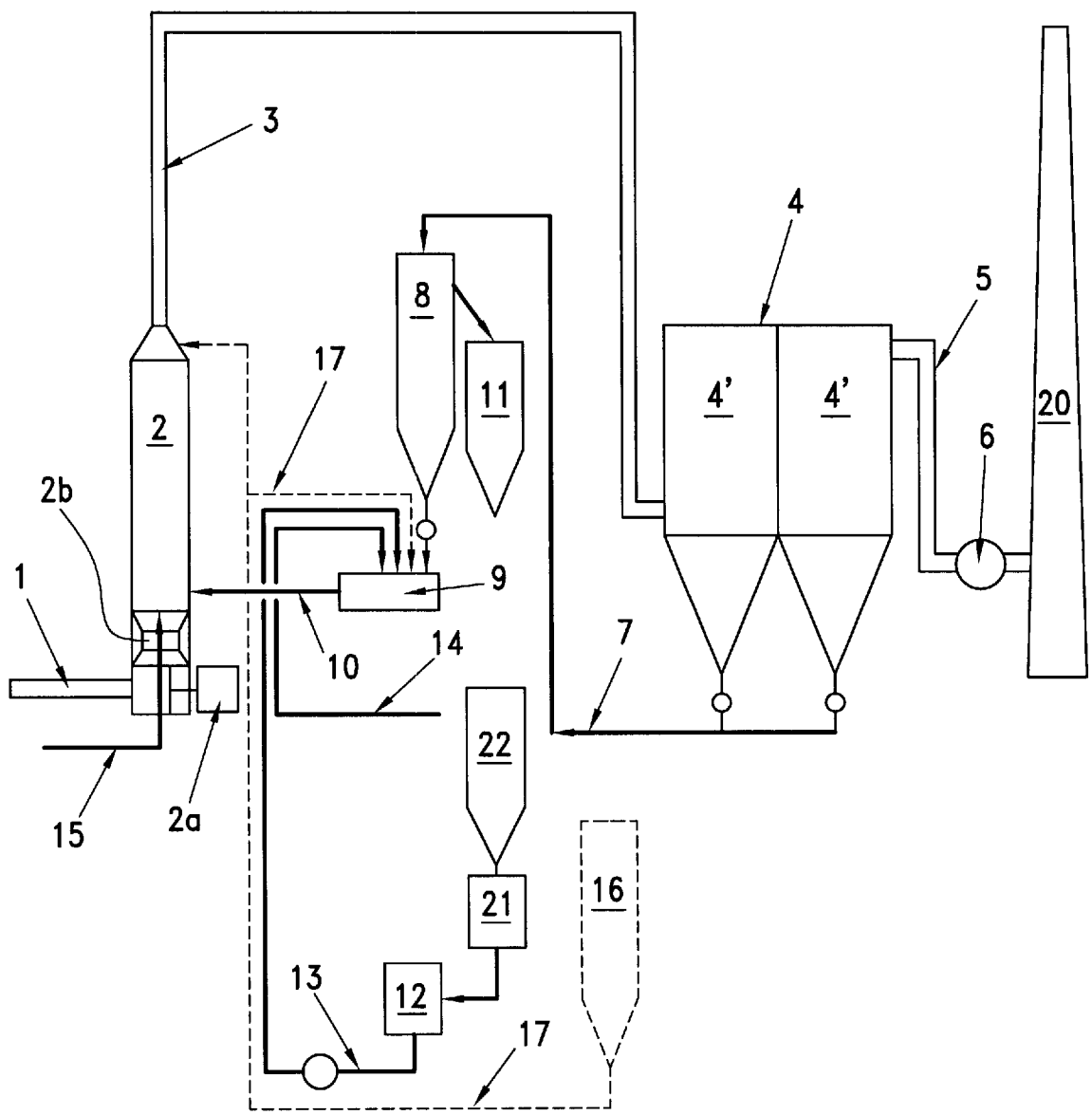
FIG. 1 is a flow diagram of a preferred embodiment of the present invention.

FIG. 1 shows a vertical reactor 2 that defines some or all of the absorption zone, and is connected to a boiler, incinerator, or other combustor through duct 1 that terminates at the bottom of the reactor vessel. Duct 3 connects the reactor to the gas/solids separator 4. Duct 5 and fan 6 connect the process to a chimney 20 in most applications. Hot flue gases from the combustor flow through duct 1, reactor 2, duct 3, and gas/solids separator 4 for cleaning of noxious components in the flue gases. The cleaned flue gases flow from the dust collector through duct 5 and fan 6 to the chimney 20. In the arrangement shown, the gas/solids separator is a fabric filter but may also be an electrostatic precipitator.

Waste gas passes through venturi 2b in the reactor 2, where the gas mixes with and entrains the particulate alkaline absorbent. The gas and entrained particulate flow into the main chamber of reactor 2, wherein the acid gases are absorbed and the temperature of the waste gas is lowered.

A reagent such as $Ca(OH)_2$ that reacts with acid gases such as sulfur dioxide, is prepared as a suspension in an external commercially available system 21, (commonly known as a slaker). The reagent suspension is stored in tank 12, and supplied by pump 13 to mixer 9. Particulate reaction products and ash from the combustor, collected in the hoppers 4' of the gas/solids separator 4, are conveyed through line 7 to a recycle bin 8. The recovered particulate flows from bin 8 through a regulating device (commonly known as a feeder) to mixer 9. The mixer combines the $Ca(OH)_2$ slurry, recovered particulate and supplemental water from line 14 into a free-flowing particulate alkaline absorbent powder with a moisture content of up to 40%. The mixer discharges the absorbent powder by gravity through line 10 to the reactor 2, wherein the moisture is evaporated into the flue gases and the powder reacts with acid gases to form the reaction products. Supplemental water is supplied through line 15 to the reactor 2 in order to provide control of flue gas temperature. Because of the evaporation of the moisture in the absorbent and the water spray, the waste gases are cooled and humidified to approximately 50–75% relative humidity. The partially spent absorbent is entrained in and flows with the cooled flue gases to the gas/solid separator wherein the reaction products and ash from the combustor are separated from the waste gases. Because of the entrainment of the reaction products in the upwardly flowing gases, the velocity of the gases must remain above the minimum for carrying the products.

Bin 8 incorporates a means of diverting excess reaction products and ash not required by the reactor, to bin 11, where the excess is discharged to a waste container or disposal vehicle.

Bin 16 and line 17 allow the optional addition of dry reagent powder or other materials to the mixer, or in alternative arrangements, to a second injection point in the reactor 2 or duct 3. Line 14 is the water supply to mixer 9. In alternative arrangements, this line may be used to supply aqueous solutions of alkali metal or alkaline earth salts (such as are contained in waste streams) to the mixer 9, wherein the solutions are combined with the absorbent powder and conveyed to the reactor 2. In such arrangements, the alkali metal salts may react with acid gases, providing either a greater removal of the acid gases or more efficient use of the $Ca(OH)_2$ reagent. In addition, this arrangement allows for simple disposal of otherwise hazardous or environmentally undesirable wastes.

Figure 3:
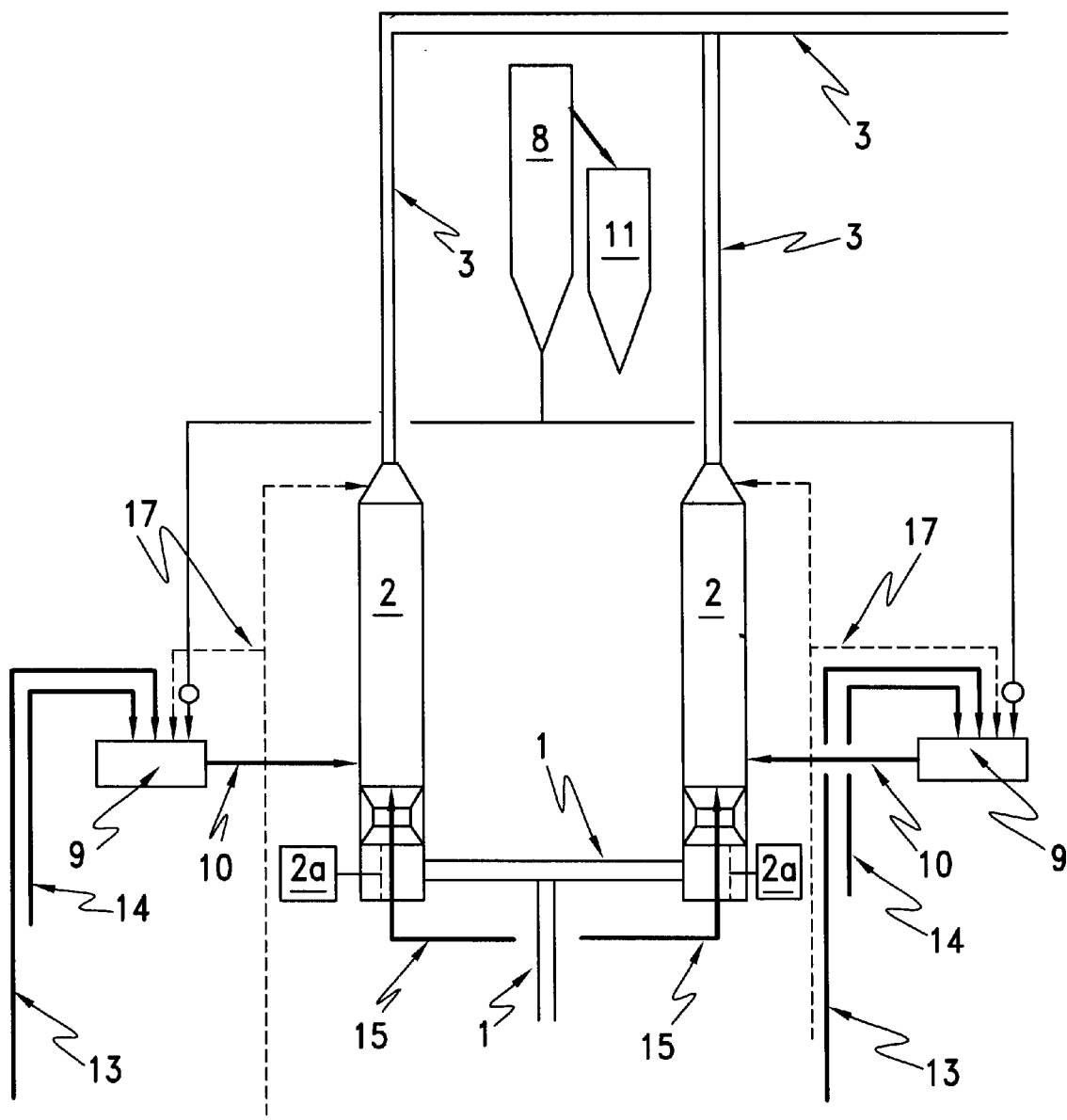
FIG. 3 is a flow diagram of another preferred embodiment using plural reactors as shown.

Valve 2a in reactor 2 provides isolation of the reactor from the flue gases flowing from the combustor. In multiple-reactor systems, for example as shown in FIG. 3, this feature allows selection of the reactors for a portion of the flue gas flow (typically 50%), which permits the reactor system to operate with lower flow rates than is otherwise possible without the valve 2a.

Lime silo 22 is designed typically to hold 7 days of lime (commercially known as "pebble lime") based on maximum consumption of lime, but may hold more or less than this amount depending on process requirements. A bulk density of 55 $lb/ft^3$ is used for sizing the silo. Lime is assumed to have a purity of 93%, with 4% waste material and a utilization rate of 67% when removing 90% of entering $SO_2$, values that are used for sizing the slaker, silo and other components of the lime slurry system.

Pebble lime stored in the lime silo 22 is fed to slaker 21, wherein CaO reacts with water supplied to the slaker to form $Ca(OH)_2$. Slaker 21 includes mixers, tanks, grit screens and temperature controls. Slurry is stored in tank 12, which also serves as the system feed tank. The system can be designed to utilize hydrated lime as well as pebble lime. Slaker 21 is designed to deliver slurry with approximately 18% by weight of solids although certain other types of slakers that can deliver up to 30% solids may be used in the process of the present invention. Alkaline reagents other than $Ca(OH)_2$, that react with acid gases, may be used in the process of the present invention.

Reactor Tower 2

Figure 2:
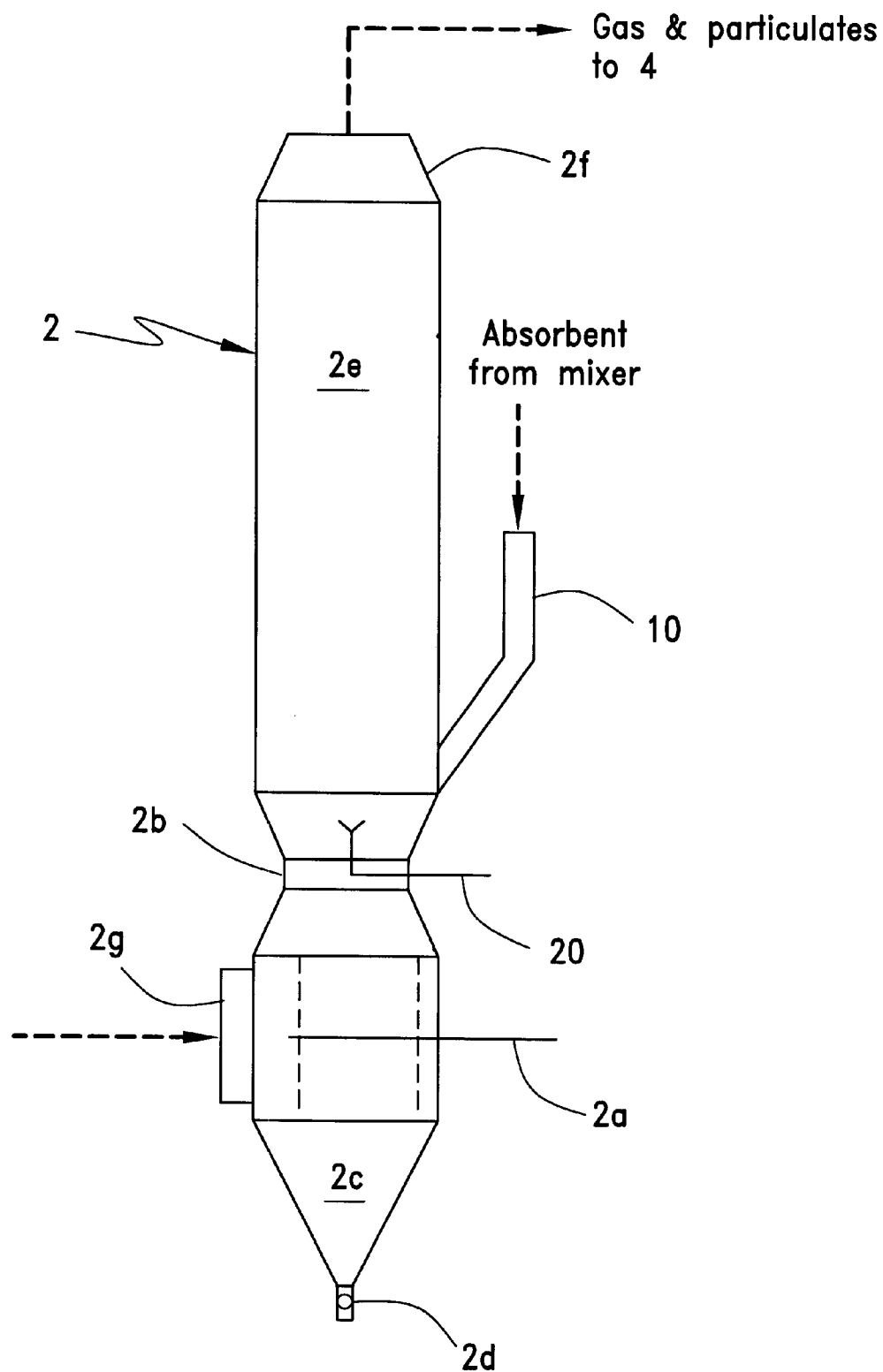
FIG. 2 is a schematic view of an absorption tower which contains some or all of the absorption zone in the preferred embodiment of the process illustrated in FIG. 1.

One or more reactors 2 may be used in the process. As shown in FIG. 2, the reactor consists of a drop-out hopper 2c, valve 2d, inlet chamber 2g with optional isolation valve 2a, venturi section 2b, drying chamber 2e, and a transition section 2f to duct 3 that conveys waste gas to the gas/solids separator 4. The drying chamber is approximately 35 feet in length. Particulate alkaline absorbent flows by gravity through chute 10, entering the reactor 2 at a point above the venturi section 2b. When more than one reactor is used in the process, inlet poppet valves may be provided for isolation of inactive reactors, allowing a high turndown ratio. The valves 2a further allow for inspection of inactive reactors when the process is running. The reactor 2 has no spray nozzles for introduction of slurry and thus avoids the problem of nozzle plugging and wear. A nozzle 20 for injecting water may be provided in alternate embodiments of the process. Another optional modification of the reactor 2 is provision of a separate port for introduction of supplemental dry absorbent.

Gas/Solids Separator 4

The typical embodiment will employ fabric filters with conventional design. The separator will be designed to accommodate particulate loadings of up to 400 grains per actual cubic foot of waste gas entering the separator. The typical filter design will use outside filtration and pulse cleaning with compressed air.

Recycle Silo 8

The recycle silo 8 is the feed storage vessel for the mixer 9. This silo is typically designed to hold up to a one-hour supply of recovered particulate, based on the maximum flow. The silo is sized on the basis of 45–60 $lb/ft^3$ particulate bulk density. All particulate recovered in the gas/solids separator 4 flows to the recycle bin. Excess particulate overflows from the recycle silo to the disposal silo.

Disposal Silo 11

The disposal silo 11 receives excess particulate from the recycle silo, and is designed to provide up to 8 days storage, based on maximum flow rates. The silo sizing is based on a bulk density of 50–60 lb/ft³.

Air Compressor

An air compressor, not shown in FIG. 1, provides compressed air at approximately 90 PSIG delivery pressure. The quantity of air is selected to exceed that required by the gas/solids separator, &pray nozzles, pneumatic operators, and other consumers in the system.

Mixer System 9

The mixer system 9 consists of a volummetric feeder, dual-shaft paddle mixer unit with drive, and a complement of spray nozzles for introducing lime slurry, water, and other liquid streams as required. The preferred mixer design uses counter-rotating shafts carrying paddles (commonly known as a pug mill). Other types of mixers may be employed. The feeder, one for each mixer, is equipped with a variable-speed inverter drive providing control of flow of recovered particulate to the mixer. Recycled particulate flows from the recycle silo through the feeder to the mixer, wherein lime slurry, water and other liquid streams are sprayed onto the particulate. The mixed particulate alkaline absorbent flows from the mixer 9 through chute 10 to reactor 2. The combination of controlled flows of liquids and solids, with efficient mixing action, produces an absorbent that flows easily and dries in a short time period in the reactor 2. The moisture content of the absorbent is reduced to the minimum possible before the absorbent enters the gas/solids separator.

The recovered particulate solids collected in silo 8 and used in mixer 9 will consist primarily of calcium sulfite, calcium sulfate, calcium hydroxide, and fly ash (from the combustion (source). The sulfate and sulfite are products of the reaction between $Ca(OH)_2$ and $SO_2$ contained in the waste gas and absorbed in reactor 2. The recovered particulate solids will have the following particle size distribution:

- 90–95% less than 250 microns
- 80–90% less than 106 microns
- 20–40% less than 75 microns
- 05–20% less than 45 microns The presence of water on the particulate alkaline absorbent introduced in the absorption zone is important to the efficiency of the absorption reactions involved in removal of $SO_2$ from the waste gases. The $SO_2$ is absorbed in the water, forming sulfurous acid that then reacts with $Ca(OH)_2$ forming calcium sulfite and sulfate. The amount of water in the absorbent introduced in the reactor 2 is preferably 5–40% by weight based on the total weight of the feed. More preferably, the water content is 5–20% by weight. Amounts greater than 40% will cause agglomeration of solids within the reactor. Amounts less than 5% will not promote efficient absorption of acid gases. The flows of solids, water and slurry to the to the mixer 9 are controlled so that there is essentially no agglomeration of solids in the reactor 2.

Process Controls

Process controls include reactor load control, gas temperature control, absorbent moisture control, and $SO_2$ control.

1. Reactor Load Control

The venturi 2b in each reactor imposes a pressure loss on the flowing waste gas stream. This pressure loss is monitored and used in the control system to infer the flow of gases through the reactor. The control system includes provisions for switching multiple reactors in and out of service according to demand. The reactor load control is also used to control associated mixers 9.

2. Gas Temperature Control

Temperature instruments are provided in the duct 3 leading from reactor 2 to the gas/solids separator 4. The instruments are monitored and used by the control system to control the amounts of water added directly to the absorbent in the mixer 9 and in the reactor 2.

The temperature is controlled to within approximately 25° F. (or less) of the adiabatic saturation temperature of the waste gas stream. Variation from the selected temperature causes the amount of water added to the absorbent to vary. Temperature excursions indicate the existence of problems and may necessitate the isolation and bypass of fabric filters when such are used as the gas/solids separator 4.

3. $SO_2$ Control

A continuous emission monitor provides the concentration of $SO_2$ in the outlet. The concentration is used in the control system to vary the flow of lime slurry to the mixer 9.

FIG. 3 represents a modification of the embodiment of FIG. 1 wherein two vertical reactors 2 are deployed in parallel with duct 1 split to feed flue gases to either or both vertical reactors 2. The flue or waste gases are selectively fed to one or the other or both reactors 2 by opening/closing valves 2a. Other than duplication of units, the embodiment of FIG. 3 is otherwise similar to that of FIG. 1.

Summary

The advantages of the present invention over the prior art may be summarized as follows:

1. The process of the present invention can operate more closely to the adiabatic saturation temperature (AST). An approach of 15–25° F. is possible, and allows higher efficiency and/or lower consumption of alkaline reagent.

2. Recycled particulate solids are reactivated in an external mixer that allows accurate control of moisture content in the particulate alkaline absorbent. The precision of the mixing and control improves drying performance and reaction efficiency in the absorption zone.

3. All recovered particulate solids flow from the separator to the recycle bin. Only the excess flows from the recycle bin to the disposal system. This arrangement requires only one conveying system, minimizing equipment and increasing reliability. Since the collected material is not classified, the recycled material will includes fines which improves the drying efficiency of the process.

4. The process design allows high turndown ratios.

5. The process does not require the use of cyclone separators and therefore has lower pressure losses and power consumption.

6. The process lowers maintenance costs by elimination of slurry sprays in the absorption zone, by elimination of cyclone collectors, and by minimizing the conveying system requirements.

7. Drying time is reduced, allowing smaller reactors, and increasing reliability by avoiding agglomeration of solids within the absorption zone.

8. Power consumption related to spraying is minimized.

The invention may be embodied in other specific forms without departing from the essential characteristics thereof. The present embodiments are therefore to considered in all respects as illustrative and not restrictive, the scope of the invention being indicated by the appended claims other than the foregoing description, and all changes which come

I claim:

1. A method for removing acid gases, including $SO_2$, from a waste gas said method comprising:

introducing a solid particulate alkaline absorbent, in the form of a free-flowing powder through a first port, into an absorption zone;

passing the waste gas through the absorption zone for entrainment of the powder introduced therein, said entrained powder flowing with the gas to a gas/solids separator;

reacting said acid gases, including $SO_2$, with the powder to form a dry, free-flowing reaction product;

receiving the entrained powder and waste gases in the gas/solids separator separating particulate solids, including said reaction product, from the waste gas and recovering a major portion of the separated particulate solids for reuse in the absorption zone;

admixing the recovered particulate solids with an externally prepared suspension of calcium hydroxide in water, to coat the recovered particulate solids with the suspension of calcium hydroxide in water, to form the free-flowing powder used in the absorption zone for the purpose of absorbing acid gases; and evaporating water contained in the particulate alkaline absorbent in the absorption zone, thereby causing a reduction in the temperature of the waste gas, and increasing the humidity of the waste gas.

2. The method of claim 1 wherein supplemental water is added to the particulate alkaline absorbent for the purpose of control of flue gas temperature.

3. The method of claim 1 wherein supplemental water is injected in the absorption zone separately and distinctly from the water added to the particulate alkaline absorbent.

4. The method of claim 1 wherein at least one aqueous solution of alkali metal salt is added to the particulate alkaline absorbent for disposal with un-recovered particulate solids.

5. The method of claim 1 employing at least two absorption zones respectively located in separate reactors with one of said reactors in an active state receiving waste gas and another of said reactors in an inactive state isolated from the waste gas.

6. The method of claim 1 wherein all particulate solids separated by the gas/solids separator are conveyed to a collection bin thereby ensuring the availability of sufficient particulate solids in the collection bin, and further comprising conveying excess particulate solids to a disposal bin.

7. The method of claim 1 further comprising introducing a supplemental absorbent or oxidant, through a secondary injection port, into the absorption zone for the purpose of enhancing absorption of acid gases or other gaseous pollutants.

8. The method of claim 1 wherein the absorption zone is contained within a reactor vessel comprising a vertical cylindrical drying reaction chamber, a horizontal gas entrance chamber, a venturi section, and a gas duct leading to the gas/solids separator.

9. The method of claim 1 wherein the particulate alkaline absorbent introduced into the adsorption zone contains 5–40 wt. % water.

10. The method of claim 1 wherein said particulate alkaline absorbent introduced into the adsorption zone contains 5–20 wt. % water.

11. The method of claim 1 further comprising controlling the temperature of said absorption zone to within approximately 25° of adiabatic saturation temperature of the waste gas.

* * * * *